United States Patent [19]
Randolph et al.

[11] 4,081,651
[45] Mar. 28, 1978

[54] APPARATUS METHOD FOR WELDING TANK SECTIONS

[75] Inventors: Robert W. Randolph, St. Charles; Steven L. Jantzen, St. Louis, both of Mo.

[73] Assignee: ACF Industries, Incorporated, New York, N.Y.

[21] Appl. No.: 683,662

[22] Filed: May 6, 1976

[51] Int. Cl.$^2$ .............................................. B23K 31/06
[52] U.S. Cl. ........................................ 219/61; 219/66; 219/159
[58] Field of Search ...................... 219/59, 61, 66, 158, 219/159; 72/399; 269/26

[56] References Cited
U.S. PATENT DOCUMENTS 3,361,319  1/1968  Sato ......................................... 219/59

Primary Examiner—E. A. Goldberg
Attorney, Agent, or Firm—Henry W. Cummings

[57] ABSTRACT

Apparatus is disclosed for supporting and rotating a pair of hollow tank sections of generally circular cross section, including scalene frusto-conical tank sections, during welding of the sections in end-to-end abutting relation to form an elongted tank. The apparatus includes three longitudinally spaced, axially aligned, rotatable rings which define a welding cage. The center ring includes a plurality of circumferentially spaced, radially directed jacks, each extendible the same distance regardless of the resistance encountered by a particular jack to force the abutting edges of the tank sections into a precise circular cross section and support and hold the abutting edges in aligned relation during rotation and welding. The two side rings include circumferentially spaced radially directed jacks of the seek and find type that will automatically extend until all jacks exert the same force on the tank sections extending from each side of the center ring to thereby support the tank sections for rotation about the common axis of the three rings, regardless of whether the tank sections are of cylindrical, right frusto-conical or scalene frusto-conical shape. A longitudinally extending conveyor is provided which extends within the welding cage and on either side of the welding cage for moving adjacent tank sections longitudinally toward each other into abutting engagement for welding, and for moving welded sections longitudinally of the cage.

24 Claims, 22 Drawing Figures

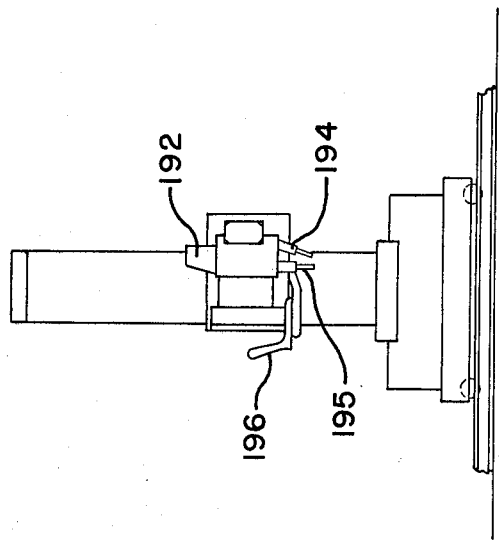
FIG. 17
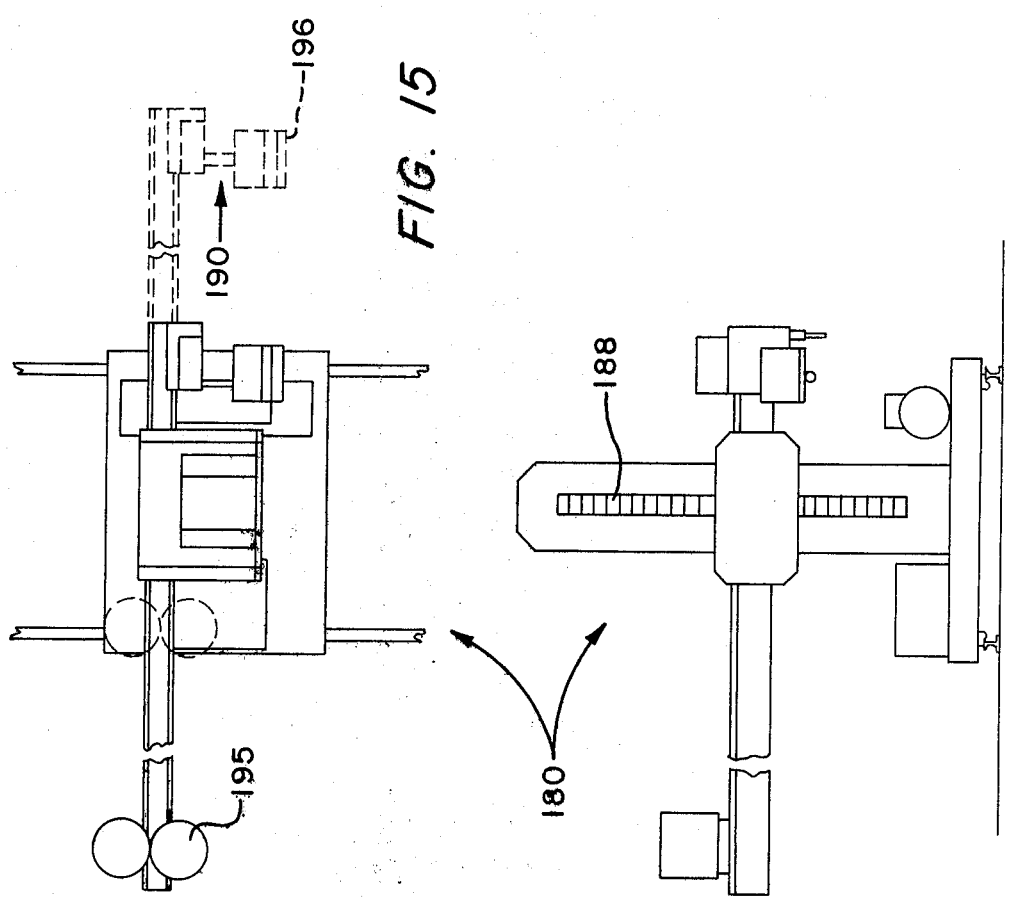
FIG. 15
FIG. 16

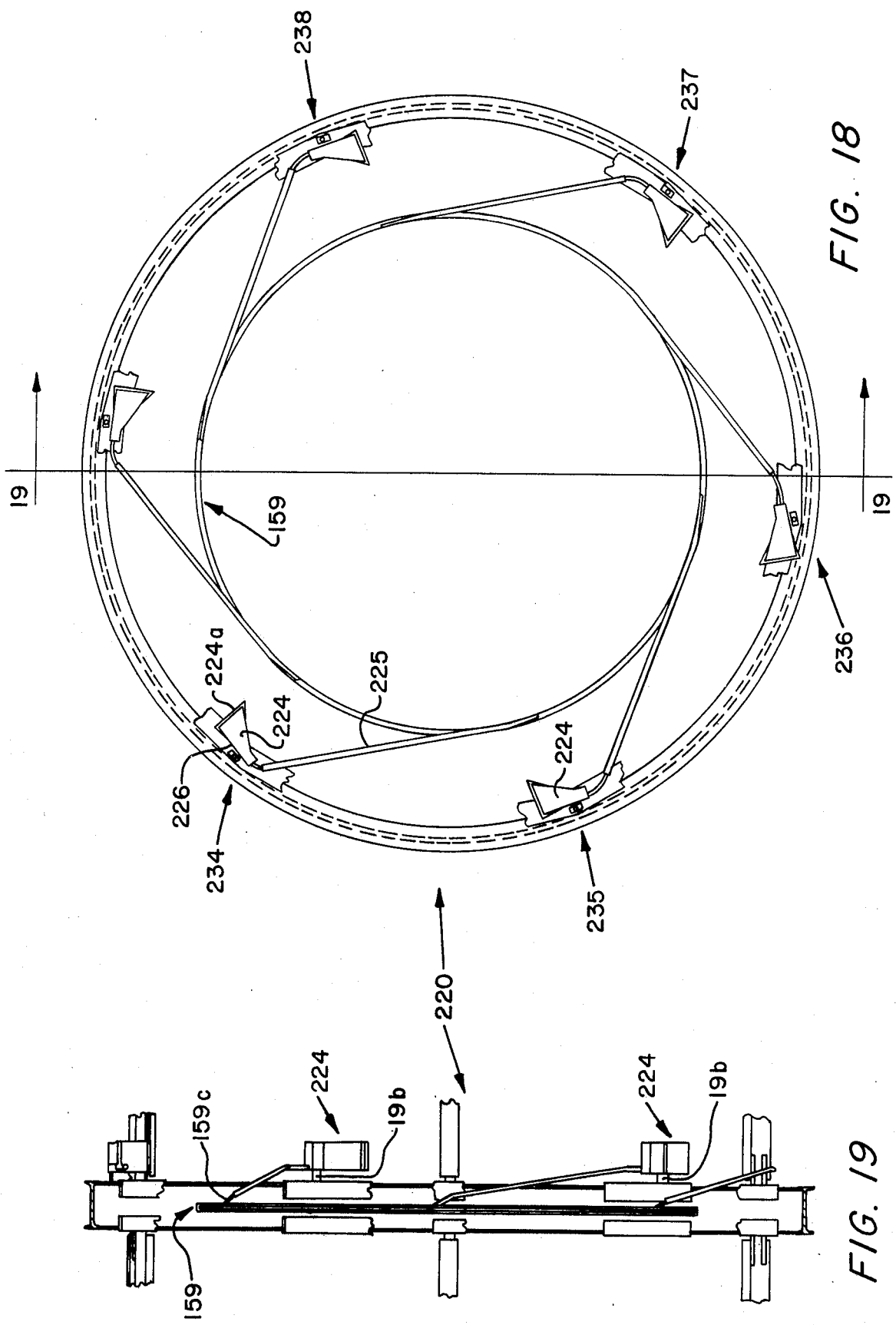

APPARATUS METHOD FOR WELDING TANK SECTIONS

BACKGROUND OF THE INVENTION

Various arrangements have heretofore been proposed for aligning, supporting and rotating hollow tank sections during welding of the sections in end-to-end abutting relation to form an elongated tank. Such arrangements however are not adapted to accommodate and rotate scalene frusto-conical tank sections, such as used to form sloped bottom tanks.

One such arrangement is illustrated in U.S. Pat. No. 3,888,103, issued June 10, 1975. In this arrangement a plurality of hydraulic clamping jacks arranged in circular configuration are used to form and support the edges of cylindrical tank sections for welding in end-to-end abutting relation. Vertically adjustable rollers position on each side of the hydraulic jacks support the lower surfaces of the tank sections for rotation. The hydraulic jacks are mounted on a fixed support and cannot however be rotated with the tank sections and the tank sections must be first tack welded and the hydraulic jacks retracted before the tank sections can be rotated to complete the welding. Because the tank sections are supported only at the lower surfaces by the adjustable rollers, scalene frusto-conical tank sections cannot be accommodated for rotation as the axes of scalene frusto-conical sections do not coincide with the axis of the circular abutting edges of the tank sections.

Another arrangement is shown in the April, 1969 issue of the publication "Welding and Metal Fabrication." In this arrangement a pair of segmental sizing rings are used to clamp and hold the edges of cylindrical tank sections in end-to-end, abutting relation during welding. The sizing rings are rotably mounted and rotate with the tank sections during welding. The sizing rings however will only accommodate tank sections of a single diameter, and different sizing rings must be used for different diameter tank sections. Also the tank sections are supported on each side of the sizing rings by rollers which engage only the lower surfaces of the tank sections and scalene frusto-conical tank sections cannot be accommodated for rotation as the axes of the frusto-conical sections do not coincide with the axis of the circular abutting edges of the tank sections.

SUMMARY OF THE INVENTION

In accordance with the present invention apparatus is provided for supporting and rotating a pair of hollow tank sections of generally circular cross section, including scalene frusto-conical tank sections, during welding of the sections in end-to-end abutting relation to form an elongated tank. The apparatus includes three longitudinally spaced, axially aligned, rotatable rings which define a welding cage. The center ring includes a plurality of circumferentially spaced, radially directed center jacks each extendable the same distance regardless of the resistance encountered by a particular jack to force the abutting edges of the tank sections into a precise circular cross section and support and hold the abutting edges in aligned relation during rotation and welding. The two side rings include circumferentially spaced radially directed side jacks of the seek and find type that will automatically extend until all jacks exert the same force on the tank sections extending from each side of the center ring to thereby support the tank sections for rotation about the common axis of the three rings regardless of whether the tank sections are of cylindrical, right frustoconical or scalene frusto-conical shape. Preferably, at least one set of precisely movable jacks is provided at the bottom of each of the side rings to raise and lower tank sections to be welded. Preferably, the precisely movable jacks are mechanical and the seek and find jacks are hydraulic.

A longitudinally extending conveyor is provided for longitudinally moving tank sections relative to the cage into abutting engagement for welding and for moving welded sections longitudinally relative to the cage. The jacks in the side rings are provided with a movable tank contact surface which is supported by a spherical member which moves on a fixed spherical surface when the tank contact surface engages a tank section. The cage is rotated during internal circumferential welding of adjacent courses held in the assembly by the center jacks and the side jacks.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 15 is a schematic plan view of the welding assembly used in the apparatus of the present invention;

FIG. 16 is a side elevation view of the welding assembly shown in FIG. 15;

FIG. 17 is a front elevation view of the welding assembly shown in FIGS. 15 and 16;

FIG. 18 is a view looking in the direction of the arrows along the line 18—18 in FIG. 2 illustrating the rotating flux troughs of the flux backup assembly;

FIG. 19 is a sectional view looking in the direction of the arrows along the line 19—19 in FIG. 18;

DESCRIPTION OF PREFERRED EMBODIMENTS

Figure 1:
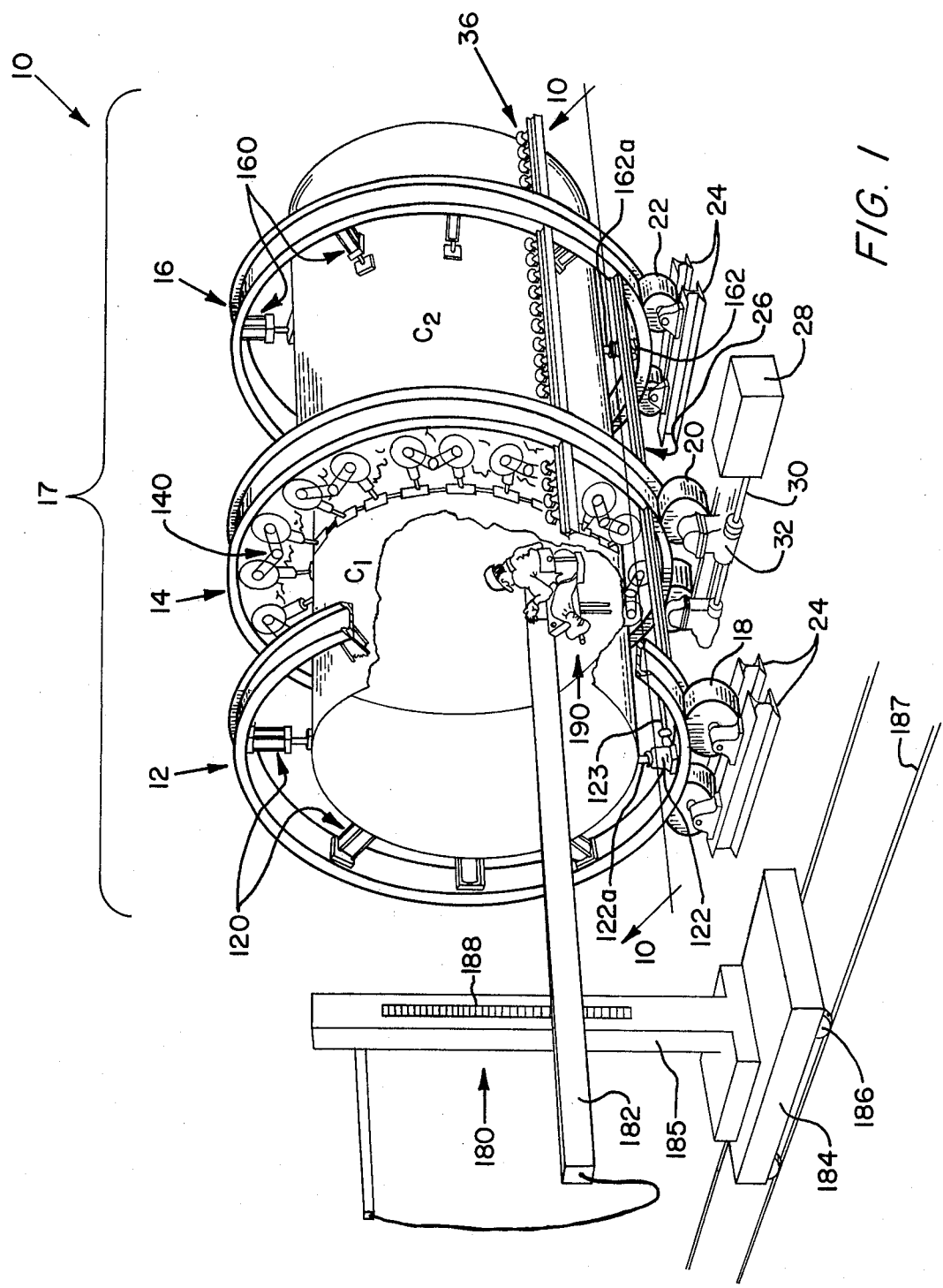
FIG. 1 is a perspective view of the welding apparatus of the present invention.
Figure 2:
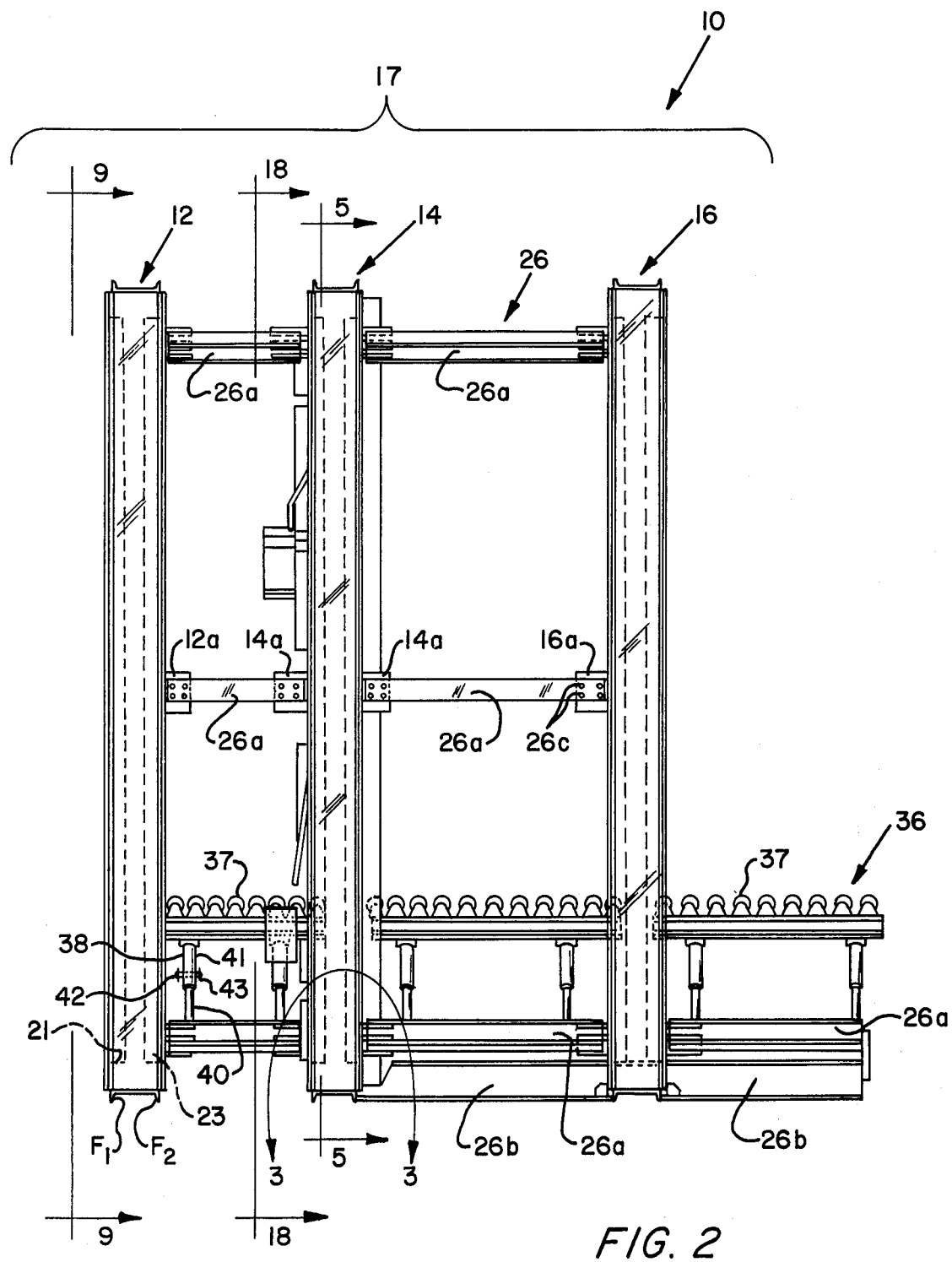
FIG. 2 is a side elevation view of the three-ring cage portion of the welding apparatus of the present invention.
Figure 3:
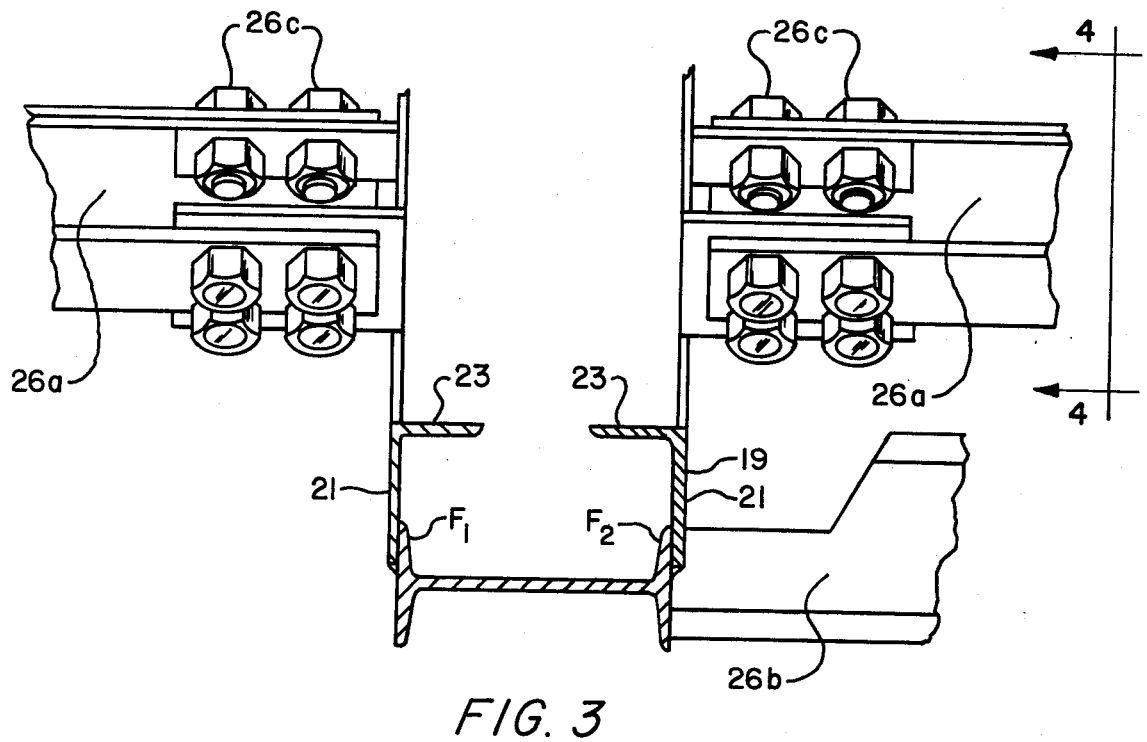
FIG. 3 is an enlarged detail view partly in section of the portion of the center ring indicated by the line 3—3 in FIG. 2.

The welding assembly of the present invention is indicated in FIG. 1 generally at 10. The assembly includes three longitudinally spaced, axial aligned rings 12, 14 and 16 which define a welding cage 17. Each ring is supported on rollers shown respectively at 18, 20 and 22. Each of the rollers have suitable I beam supports 24. Each of the rings 12, 14 and 16 is of an I beam cross section as shown in FIGS. 1, 2 and 3 and includes flanges $F_1$ and $F_2$. A series of lengths of angle members 19 shown in FIGS. 3, 5 and 7 have legs 21 welded to the side of the flanges $F_1$ and $F_2$ of the rings 12, 14 and 16 with the legs 23 thereof inwardly directed to provide flat surfaces 23 for mounting the hereinafter described jacks.

Figure 4:
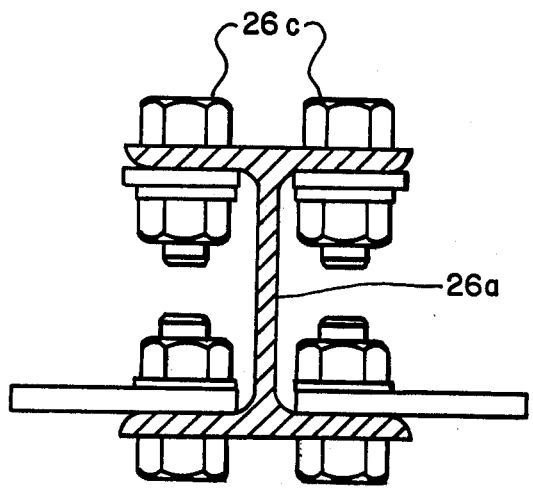
FIG. 4 is a sectional view looking in the direction of the arrows along the line 4—4 in FIG. 3.

As shown in FIG. 2 the rings 12, 14 and 16 are suitably interconnected by a frame structure 26, including a series of circumferentially spaced I beams 26a, and lower I beams 26b (FIG. 2) affixed, with fasteners 26c (FIGS. 3 and 4) to extensions 12a, 14a and 16a secured to the sides of the respective rings 12, 14 and 16 so as to enable the rings to rotate as a cage unit. The rollers 20 are driven by a variable speed drive including, for example, an electric motor mounted within a housing 28 (FIGS. 1 and 5) having a drive shaft 30 extending therefrom and connected to suitable gear units 32 to drive rollers 20.

Figure 9:
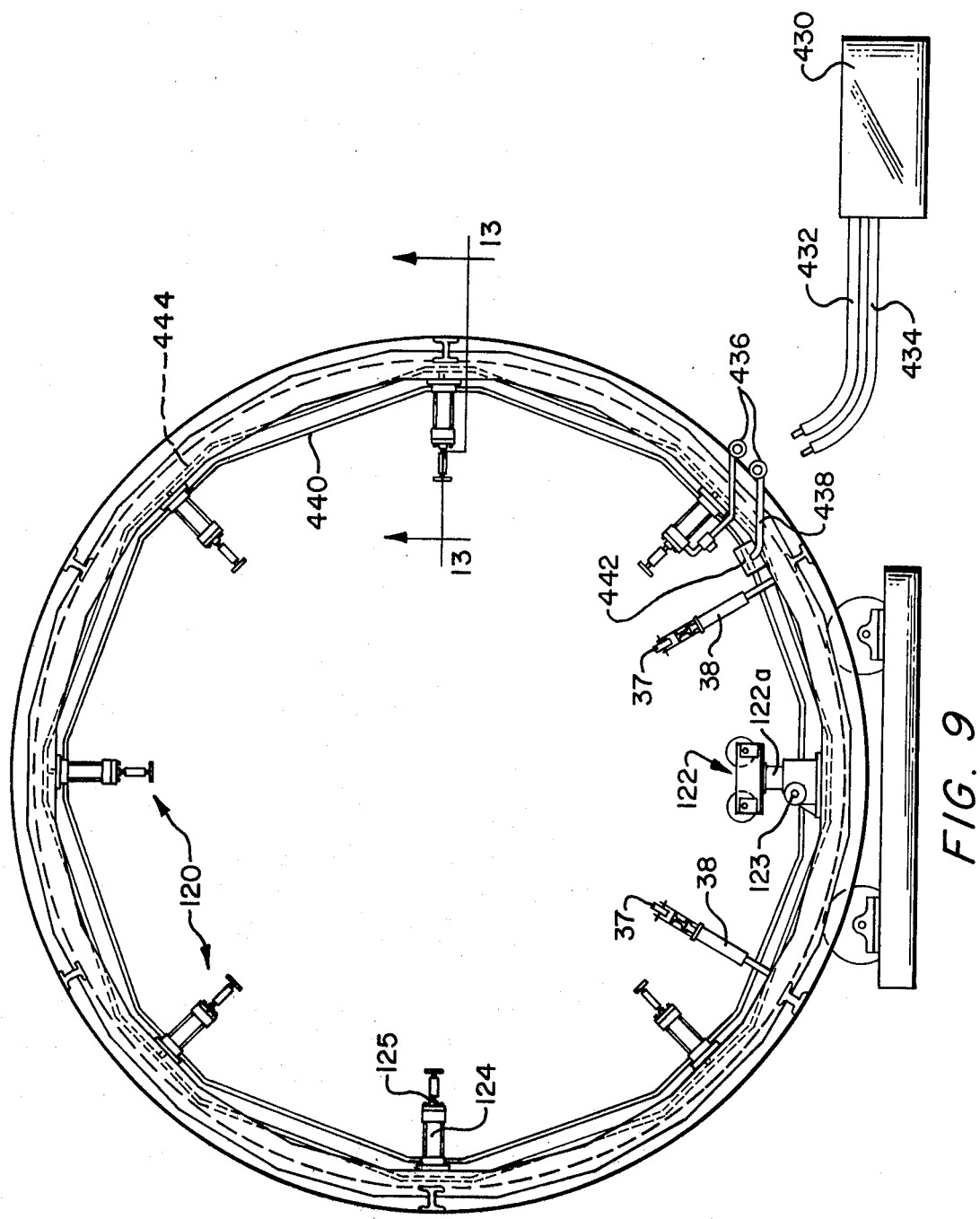
FIG. 9 is an end elevation view of a side ring looking in the direction of the arrows along the line 9—9 in FIG. 2.

A longitudinal roller conveyor 36 (FIGS. 1 and 2) is provided for moving tank courses longitudinally relative to the three ring cage into position for internal circumferential welding, and for longitudinal movement relative to the cage after welding. Conveyer 36 includes transversely spaced rollers 37 (FIGS. 2 and 9). Rollers 37 are provided with support members 38 which are preferably vertically adjustable. For example, as shown in FIG. 2, supports 38 include a pair of telescoping support members 40 and 41 each having a plurality of holes through which pins 42 may be inserted at desired levels. Cotter pins 43 may be provided to hold the pins in place.

Figure 5:
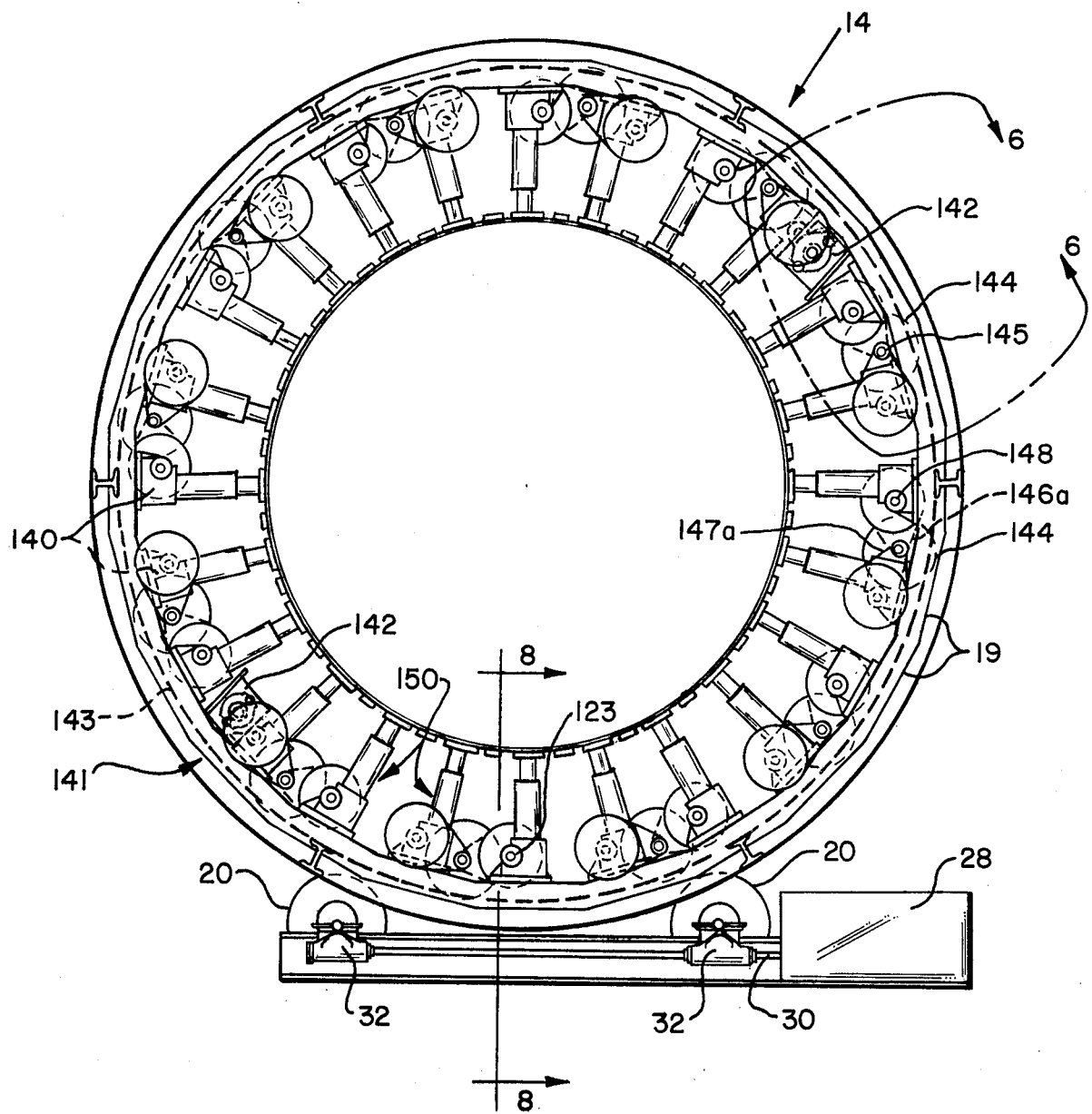
FIG. 5 is a sectional view of the center jacks looking in the direction of the arrows along the line 5—5 in FIG. 2.
Figure 7:
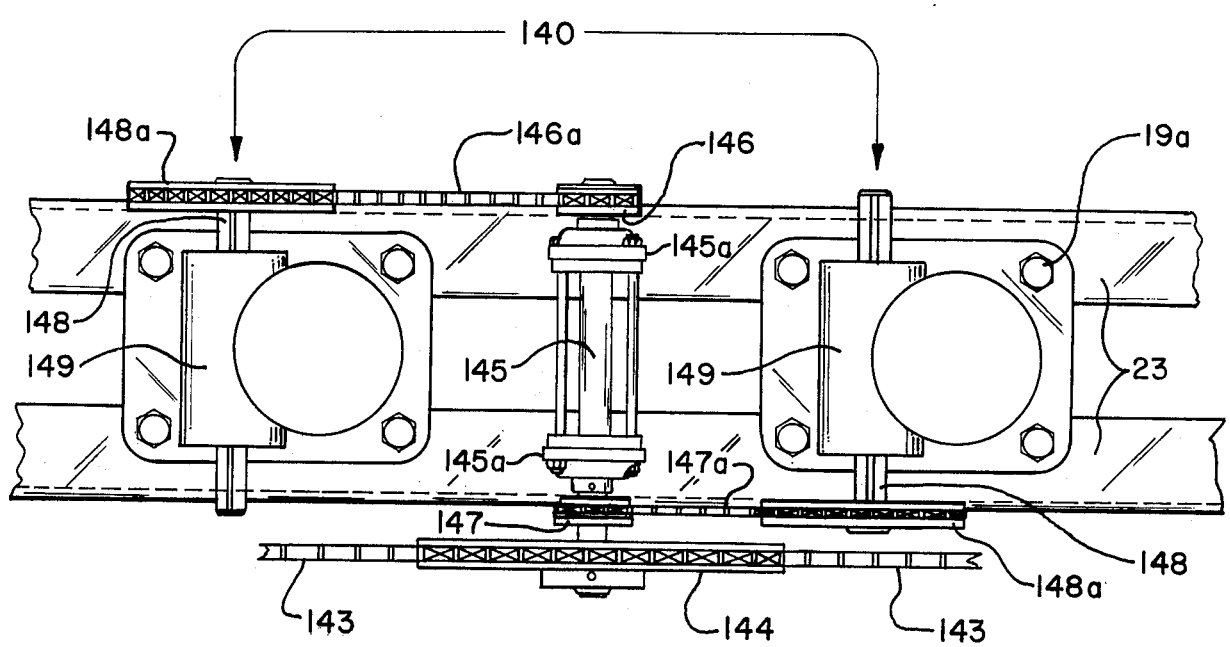
FIG. 7 is a view of portion of the center jacks illustrated in FIG. 6 looking in the direction of the arrows along the line 7—7 in FIG. 6.

As best shown in FIGS. 1 and 5 the center ring 14 has a plurality of center jacks 140 which are circumferentially mounted on the legs 23 of the flanges with suitable fasteners 19a (FIG. 7). Center jacks 140 are radially directed and each is extendable the same distance regardless of the resistance encountered by a particular center jack to force abutting edges of tank sections into a precise circular configuration, and support and hold the abutting edges in aligned relation during rotation and internal circumferential welding. Since center jacks 140 must move a specific distance regardless of the resistance encountered, this jack movement is more easily achieved with mechanical jacks. For this reason center jacks 140 are preferably mechanical. However, it is within the scope of the present invention for center jacks 140 to be hydraulic, and a control system provided to ensure that each jack moves inwardly the desired distance to form the desired circular diameter, regardless of the resistance that a particular hydraulic jack may encounter.

As best shown in FIG. 1 the side rings 12 and 16 are provided with circumferentially spaced, radially directed seek and find jacks 120 and 160 which automatically extend until all of the jacks exert the same force on the tank sections and thus clamp and hold the section for rotation while internal circumferential welding takes place at the abutting edges of the sections. This seek and find movement is more easily obtained with hydraulic jacks and thus side jacks 120 and 160 are preferably hydraulic, and connected to a common source of hydraulic fluid (430 FIG. 9) whereby each jack will extend until it exerts the same force on the tank section. However, it is within the scope of the present invention to utilize mechanical jacks for side jacks 120 and/or 160 which are provided with a suitable control to obtain the seek and find movement for clamping.

As shown in FIG. 1 the side rings 12 and 16 are also provided with bottom jacks 122 and 162 which are preferably of the type that are movable a specified distance rather than the seek and find type to initially adjust tank sections in the cage to precisely the same height prior to actuation of the seek and find jacks 120 and 160 which support the tank sections during rotation and welding.

A specific embodiment will be described in which center jacks 140 of the ring 14 and bottom jacks 122 and 162 of the side rings 12 and 16 are mechanical and the jacks 120 and 160 of the side rings 12 and 16 are seek and find hydraulic jacks.

Figure 6:
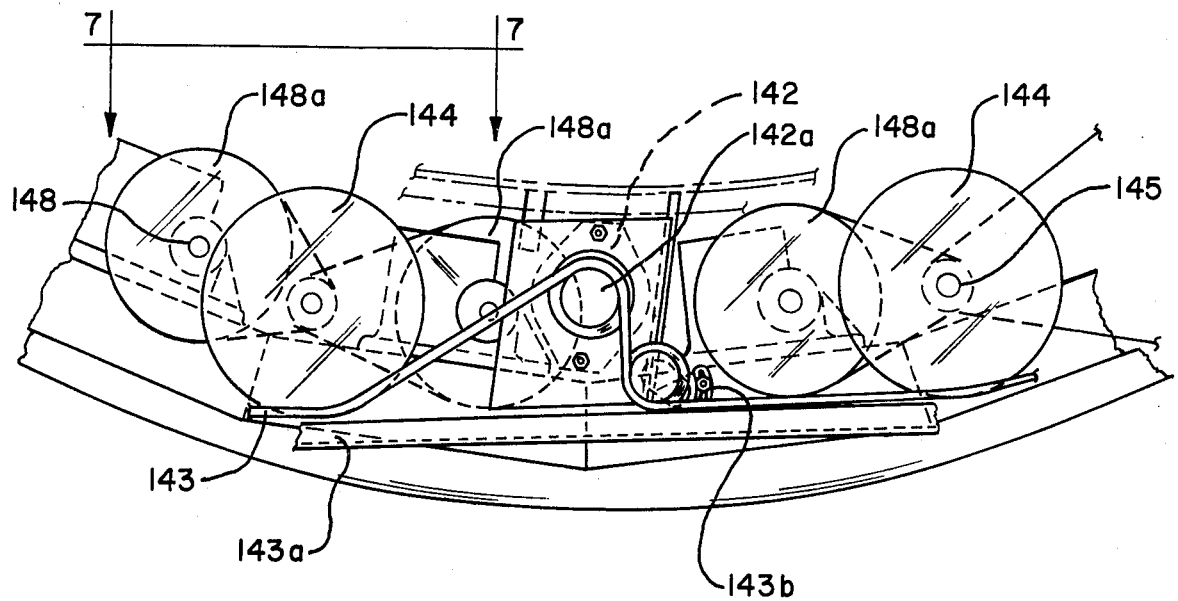
FIG. 6 is a detail view of a portion of the center jacks as indicated by the line 6—6 in FIG. 5.

As shown in FIG. 5 the mechanical jacks 140 of the center ring 14 are provided with a suitable drive indicated generally at 141. Drive 141 includes electric or hydraulic motors 142 which are mounted on the ring 14 and which drive a chain 143 through drive sprockets 142a (FIG. 6). A chain tightening drive is provided at 143b. Chain 143 is continuous around the full circumference of the center ring 14 and engages sprockets 144 which are secured to counter shafts 145 mounted for rotation in suitable bearings 145a on the ring 14 between alternate pairs of the jacks 140. A chain guard 143a may be provided.

Each of the counter shafts 145 has smaller sprockets 146 and 147 secured to opposite ends thereof and as shown in FIGS. 6 and 7 a drive chain 146a connects the sprocket 146 with a sprocket 148a of an actuating shaft 148 of a jack 140 on one side of this counter shaft 145 and a drive chain 147a connects the sprocket 147 with the sprocket 148a of the actuating shaft 148 of the jack 140 on the opposite side of the counter shaft 145. Movement of the chain 143 by the motor 142 therefore simultaneously actuates each of the jacks 140.

Figure 8:
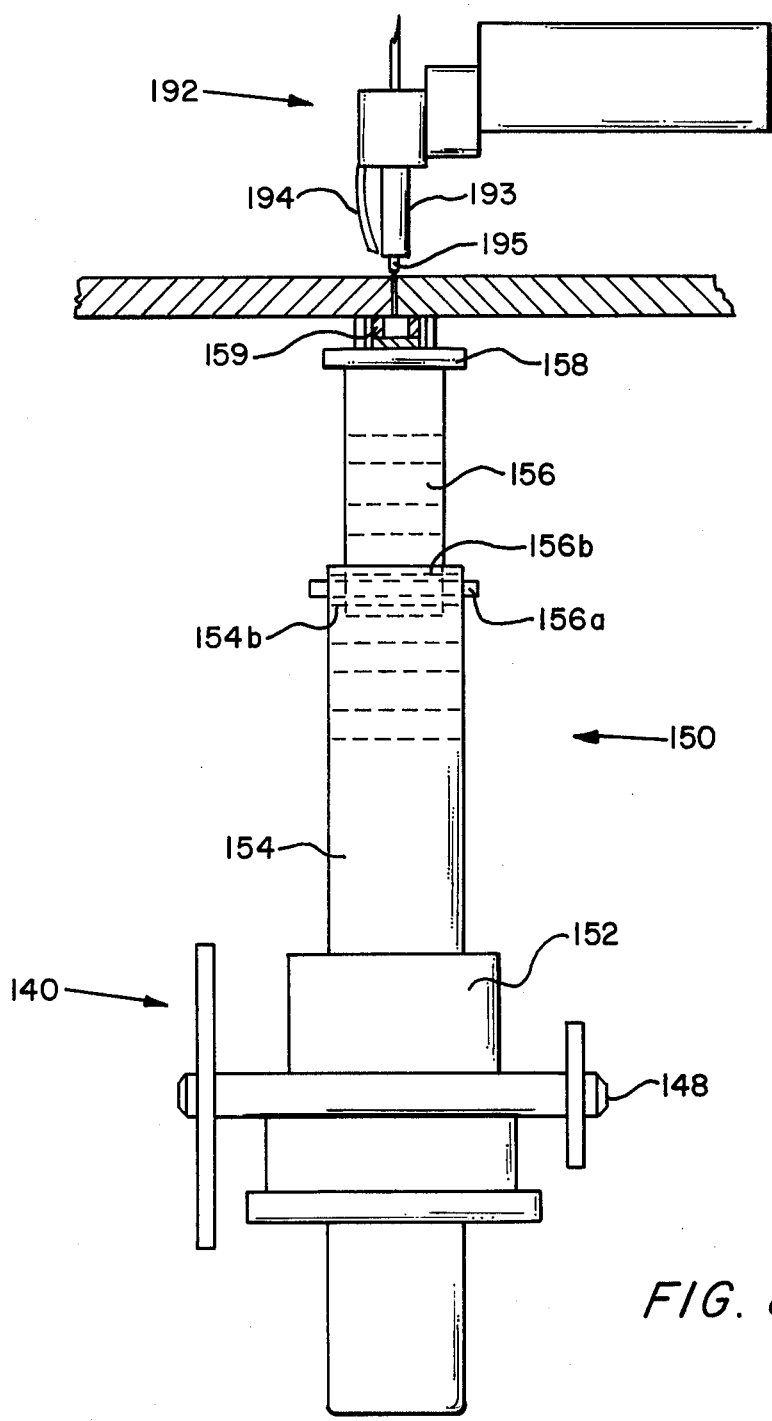
FIG. 8 is a view partly in section illustrating one of the center jacks and looking in the direction of the arrows along the line 8—8 in FIG. 5.
Figure 8A:
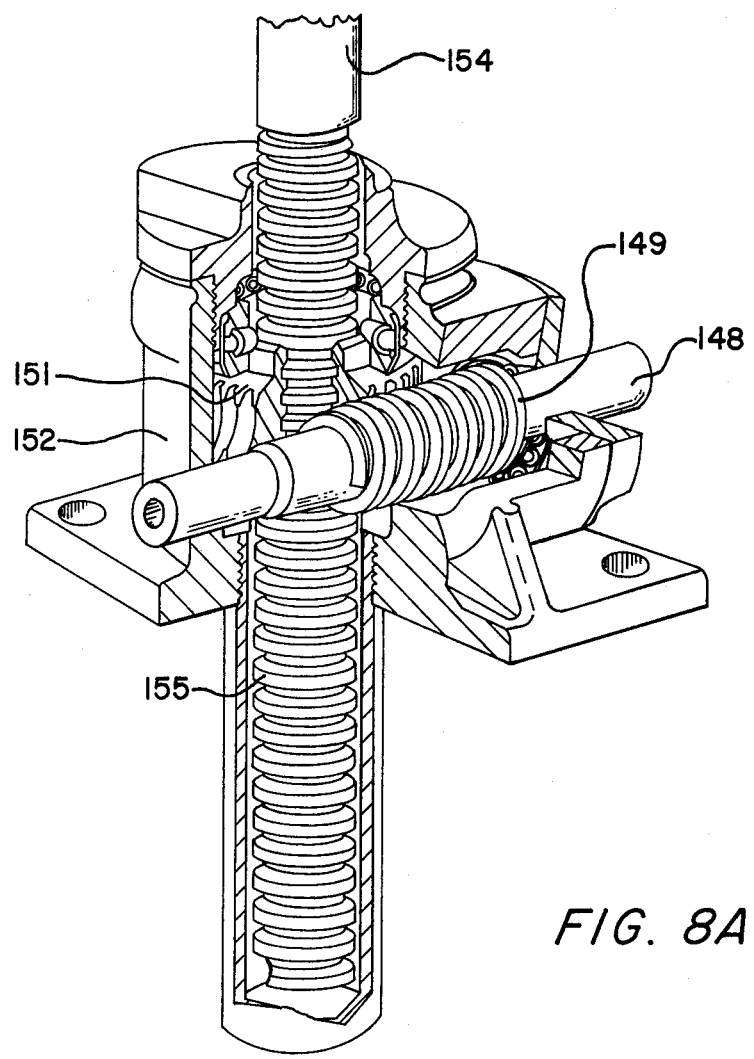
FIG. 8a is a detailed perspective view of a portion of the center jack illustrated in FIG. 8.

As shown in FIGS. 8 and 8A, the jacks 140 include a ram assembly 150 having a housing 152 and a threaded ram 154 movable therein. The actuating shaft 148 drives a worm gear 149 which in turn engages and rotates ring gear nut 151 within housing 152. Ring gear nut is threaded on the threads 155 of ram 154 and rotation of ring gear nut 151 extends or retracts the ram 154. Ram 154 is connected to an extension sleeve 156 by means of a pin 156a. Pin 156a passes through holes 154b and 156b respectively in ram 154 and sleeve 156 to provide adjustment of the length of jacks 140. A channel shaped shoe 158 is fastened to the outer end of sleeve 156 and a flux trough 159 is mounted within shoe 158.

Figure 10:
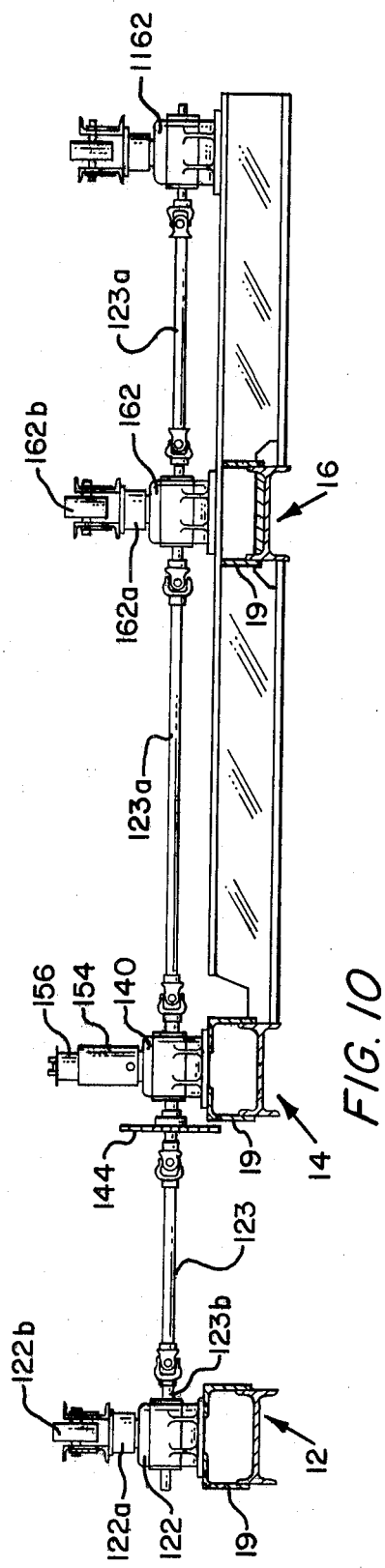
FIG. 10 is a view of the drive mechanism for the rings looking in the direction of the arrows along the line 10—10 in FIG. 1.

The bottom jack 122 of the side ring 12 and the bottom jack 162 of the side ring 16 which serve to initially raise the tank sections from the roller conveyor 36 are of the same general construction of the jacks 140 of the center ring 14 and as best shown in FIG. 10 are driven from an aligned jack 140 by means of shafts 123 and 123a which interconnect the actuating shafts 148 of the jacks 122 and 122a and the actuating shaft 148 of the center ring jack 140. Bottom jacks 122 and 162 include respective rams 122a and 162a. A clutch 123b is provided to disengage shaft 123 from driving relation with jack 122. Roller 122b and 162b are provided respectively on rams 122a and 162a to support tank courses to be welded after they have been moved into the cage 17 by means of longitudinal conveyer 37.

It will thus be apparent that movement of chain 143 in FIG. 5 by motors 142 will cause rams 154 and shoes 158 in FIG. 8 of the jacks 140 to extend inwardly toward a position engaging a tank course, and movement of chain 143 in the opposite direction will cause rams 154 and shoes 158 to move outwardly in FIG. 6 away from a tank course. At the same time, jacks 122 and 162 in the bottom of side rings will raise and lower rams 122a and 162a and rollers 122b and 162b (FIG. 10) to raise tank sections into position for welding.

If hydraulic motors are used one or more hydraulic valves may be provided which permits the hydraulic motors to be initially driven in series as the jacks 140 are moved radially inwardly to engage abutting tank courses. Then as rounding of the tank begins a switch will actuate the hydraulic valve and the motors will be driven in parallel at a lower speed but at higher torque required for rounding of the courses.

Figure 11:
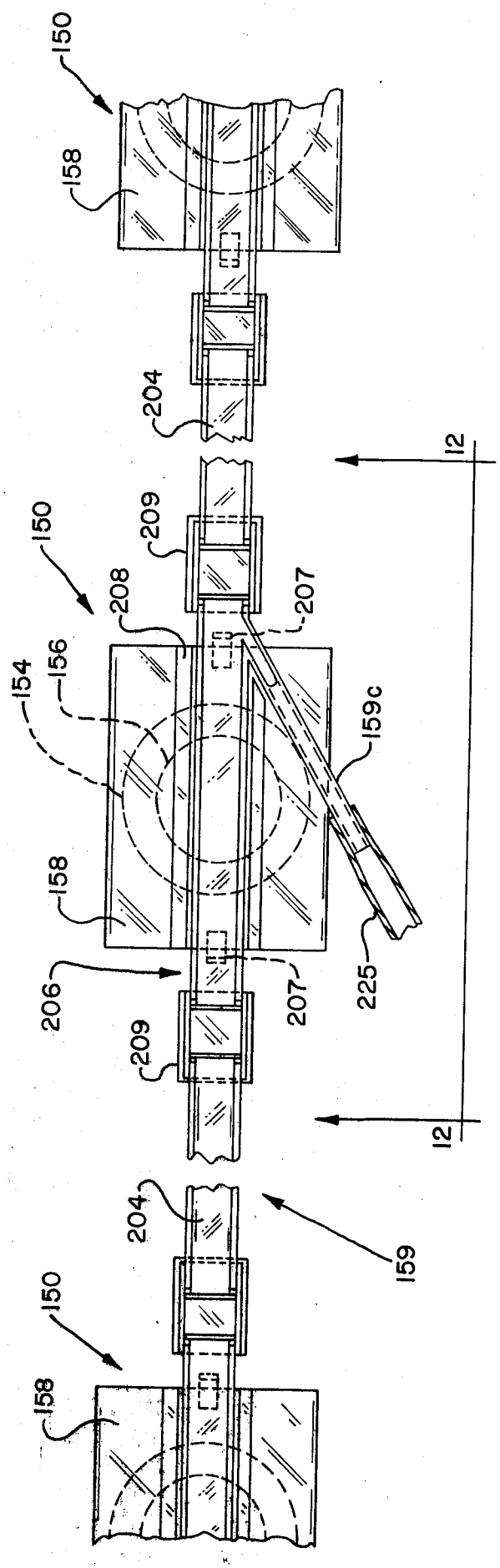
FIG. 11 is a plan view of the telescoping flux backup arrangement with the tank sections being welded removed for clarity.
Figure 12:
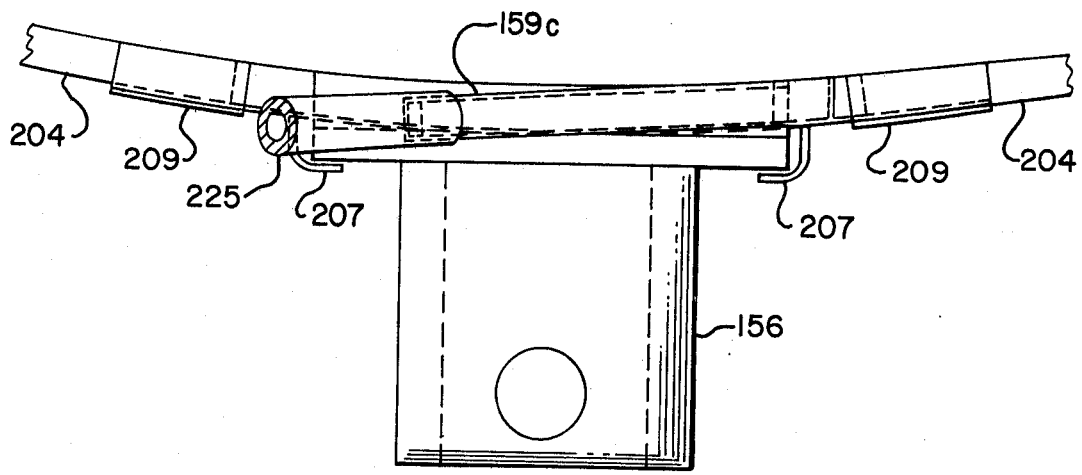
FIG. 12 is a side elevation view of a portion of the flux backup assembly looking in the direction of the arrows along the line 12—12 in FIG. 11.

Flux backup troughs 159 are discussed in detail and claimed in application Ser. No. 683,821 filed May 6, 1976 and reference is made to this application for a detailed discussion of the construction of this flux backup trough. It is sufficient for an understanding of the present invention to point out that the flux backup trough 159 includes male flux backup members 204 and female flux backup members 206 as shown in FIGS. 11 and 12. Female backup members 106 are maintained in place on shoes 158 by claws 207. The female members include a main portion 208 which extends across shoes 158 and a pair of joining portions 209 which may be welded to main portion 208. Male backup member 204 telescopes within backup portions 209 to enable the backup trough to adjust itself to different tank course diameters to be processed. Male members 204 extend between ram assemblies 150 and are supported by joining portions 209 of female members 206. When backup members 204 are completely telescoped within portions 209 the radius of curvature of the backup members corresponds to the diameter of the smallest tank section to be processed. In the completely extended position, the combined diameter of telescoping member 204 and 206 is greater than the diameter of the largest tank section to be processed.

Figure 13:
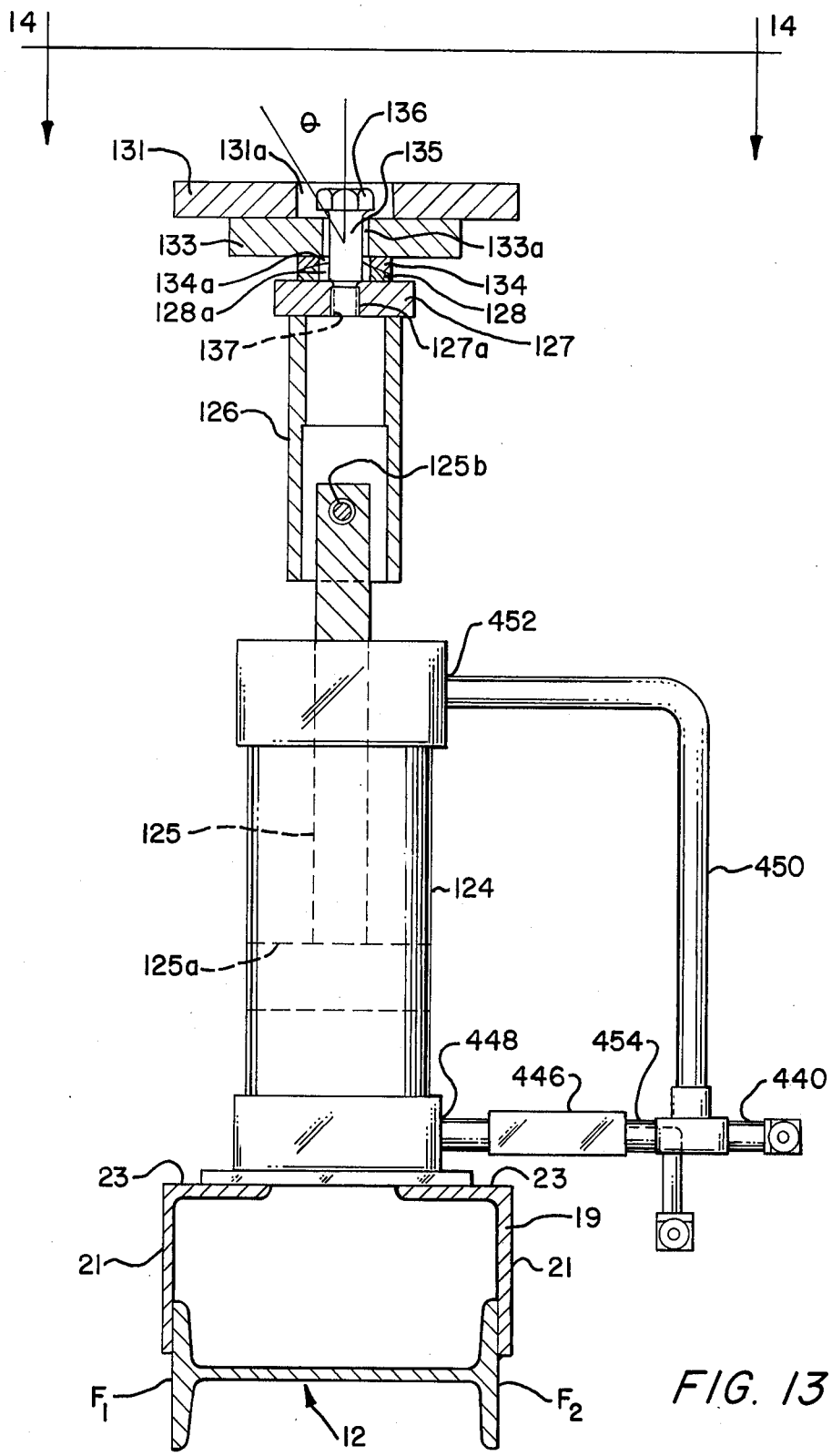
FIG. 13 is a view partly in section of one of the three confined jacks in the end rings looking in the direction of the arrows along the line 13—13 in FIG. 9.

The hydraulic jacks 120 and 160 in end rings 12 and 16 are structurally the same. As shown in FIGS. 9 and 13, the jacks include hydraulic cylinders 124 having a piston 125 movable back and forth therein. Hydraulic fluid is supplied to the cylinders from a pumping unit 430 through suitable conduits 432 and 434 which connect through quick connect couplings 436 to conduits 438 and 440 which extend within the periphery of rings 12 and 16.

One conduit 438 directs fluid through at least one directional control valve 442 and then through another conduit 444, through a check valve 446, through inlet 448, and into cylinders 124 located around the internal periphery of the ring. Hydraulic fluid entering cylinders 124 through inlets 448 on the outboard side of the piston head 125a moves pistons 125 radially inwardly to engage a tank course to be clamped. The hydraulic fluid applies hydraulic pressure equally to each of the cylinders within the ring. Some pistons will move radially inwardly more than others, depending on the resistance to radial movement which each piston encounters as a tank course is engaged. Check valves 446 prevent fluid from flowing out of cylinders 124 through openings 448. The hydraulic pressure applied is sufficient for each piston to engage and clamp a portion of the course circumference. At a predetermined pressure, a control valve 442 in each ring closes and the clamping pressure is maintained on the pistons clamping the tank courses in side rings 12 and 16. After each control valve 442 closes, conduits 432 and 434 are disconnected from quick connect couplings 436 on each side rings 12 and 16. Rings 12 and 16 may then be rotated with ring 14 while the tank courses are held in place for internal circumferential welding of their abutting edges in center ring 14.

To release the clamping pressure after the welding operation is completed and rotation of the rings has stopped, conduits 432 and 434 are again connected to couplings 436. A manual or automatic switch causes hydraulic fluid to flow from pumping unit 430 through a conduit 440 having branches 450 to introduce hydraulic fluid into cylinders 124 through openings 452 on the opposite (inboard) side of piston head 125a. Conduit 440 also has branches 454 which apply hydraulic pressure to check valves 446 to release the check valves and allow fluid to flow out through openings 448. Hydraulic fluid thus flows into cylinders 124 through openings 452, and out of cylinders 124 through openings 448, through check valves 446 and into conduit 438 toward pumping unit 130. During this time pistons 125 move away from the welded courses in side rings 12 and 16.

Control valves 442 may be purchased on the open market. An example is REXROTH valve No. 4WEH22J30/8LW120-60 NDL/5. For further discussion see Catalogue No. RA24770 issued 6/74, pp. 1–12 Rexroth Corp. 2315 City Line Road, Bethlehem, Pa. 18018. Check valves 446 are also available on the open market. An example is Waterman Pressure Operated Check Valve No. 1715-4. For further information see Waterman Hydraulics Bulletin C-4 (12705SV) 6565 West Howard Street, Chicago, Ill. 60648. Equivalent control valves and check valves to the examples cited will be apparent to those skilled in the art.

Figure 14:
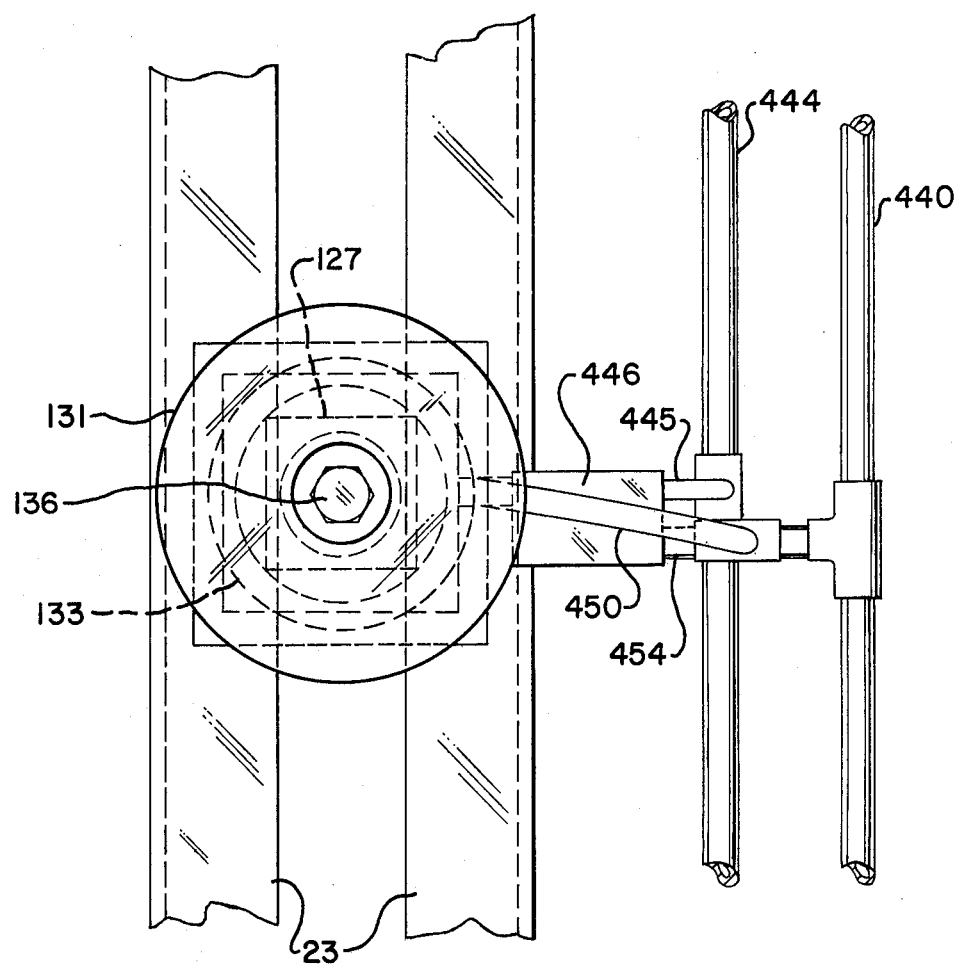
FIG. 14 is a plan view looking in the direction of the arrows along the line 14—14 in FIG. 13.

As shown in FIGS. 13 and 14, pistons 125 are connected by means of pin 125a to an extension 126. Extension 126 has a plate mounted thereon 127 having a threaded opening therein 127a. A spherical member 128 is mounted integral with plate 127. A circular tank engaging plate 131 is provided having a support plate 133 having integral therewith a cooperating spherical surface 134 which slidably engages spherical surface 128. A fastening bolt 135 has a head 136 recessed within an opening 131a in the plate 131 and threads 137 engage a threaded opening 127a and maintain flexible engagement between the plate 127 and the tank engagement plate 131 to allow surface 134 to rotate relative to surface 128 to allow self aligning of the tank engaging plate 131 with the surface of a frusto-conical tank section as hereafter described.

As shown in FIG. 13, an angle $\theta$ is defined between the neutral position of plate 133 and the rotated tank engaged position. This feature is particularly useful in assembling slope bottom tanks formed of scalene frusto-conical sections. Slope bottom tanks are processed with the top down and inclined bottom up in the cage. Surface 134 of the tank engaging plate 131 will rotate an angle $\theta$ clockwise or counterclockwise in clamping in place tank courses to be welded.

Welding equipment is provided indicated generally at 180 in FIGS. 1 and 15-17. This equipment includes a welding boom 182 mounted on a movable welding support 184 having a vertical column 185. Welding support is rendered movable by means of wheels 186 riding on a track 187 which runs transverse to the welding equipment. The height of boom 182 may be adjusted on column 185 by projections (not shown) on the boom engaging vertically spaced slots 188 on the column 185. Rolls 195 (FIG. 15) are provided to move the welding boom 182 and a welding assembly 190 mounted thereon, including the operator seat 196 longitudinally of the cage 17 as shown in solid lines in FIG. 1 and shown dotted in FIG. 15. Welding assembly 190 includes a suitable weld drive 192 having a weld guide 193, a flux supply 194, and a weld tip 195 (FIG. 8).

In order to weld abutting courses together, it is necessary to rotate the entire cage assembly while the internal circumferential weld is made at the bottom of the cage (6:00). Apparatus 220 for providing a continuous source of flux backup into telescoping trough 159 during rotation of the cage is illustrated in FIGS. 18 and 19. As mentioned above, this is the subject of patent application Ser. No. 683,821 filed May 6, 1976. It is sufficient for an understanding of the present invention to note that a plurality of flux hoppers 224 are mounted about internal periphery of center ring 14 on extensions 19b from plates 19. The hoppers 224 have a hinged cover 224a and a portion of reduced cross section as indicated at 226. A flexible flux conduit 225 is affixed to the bottom of each hopper 224 with conventional fasteners (not shown). Conduit 225 engages the outer end of a trough extension 159c of trough 159 (FIGS. 11 and 12).

At positions 234 and 235 in FIG. 18 the hopper is sufficiently vertical that flux runs out through the conduit 225 through extension 159c to provide a supply of flux to the flux trough 159. A flux backup is thus provided during the welding operation. Some slag from the welding operation may gather in the flux trough during welding. Subsequent rotation to the position 236 and 237 causes flux flow in conduit 225 in the other direction and hopper 224 begins to receive flux and slag from the welding operation. At position 238 virtually all of the flux and slag has been removed from trough 159 and has flowed back into hopper 224. This cycle is repeated during the welding operation to maintain a supply of flux in backup trough 159 at the weld point. Periodically the spent flux and slag is removed from hopper 224 and new flux added during a period when the internal circumferential weld is not being formed.

In operation, a tank section or course C1 is placed on the conveyer 36 and moved longitudinally in FIG. 1 into position with its trailing edge in line with the center of center ring 14. A second course C2 is then placed on the conveyer 36 and moved longitudinally to abut the first C1. The abutting courses C1 and C2 are then raised above conveyer 36 by means of lower jacks 122, 142 and 162 and rollers 122b, 162b. Mechanical jacks 140 are actuated to effect necessary rounding out of the abutting courses and then clamp the abutting courses together for internal circumferential welding.

The side ring seek-and-find jacks 120 and 160 are then actuated. When one of these jacks meets resistance in contacting the tank course wall it stops radial movement and pressure is diverted to the other jack cylinders until all jacks are in contact with the wall. Tank engagement members 131 may rotate to align with the tank surface during tank clamping. Rotation is particularly likely to occur when right circular scalene courses are being clamped because the diameter of these courses is different at the three clamping positions of jacks 120, 140 and 160. Side jacks 120 and 140 firmly secure the courses C1 and C2 to prevent axial movement of the weld joint during rotation of the cage. Welding assembly 190 is then moved longitudinally into the course C2. If desired, the internal longitudinal weld of course C2 can be made at this point. Rotation of cage 17 is then begun. The welding operation of the course C1 to C2 is carried out through weld tip 193 with welding flux supplied by conduit 194. Flux backup in telescoping trough 159 is provided from assembly 220. The combined courses C1 and C2 are then lowered to the conveyer and moved longitudinally from left to right (note in FIG. 2 that conveyer 36 extends beyond ring 16 to support tank sections previously welded). Additional courses are welded to this assembly according to the technique just described. For assembling additional tank sections, additional jacks 1162 similar to bottom jacks 122 and 162 may be mounted upon support structure 26b (FIG. 10) and driven from an extension of shaft 123a to raise and lower the tank sections which have been previously assembled.

Figure 20:
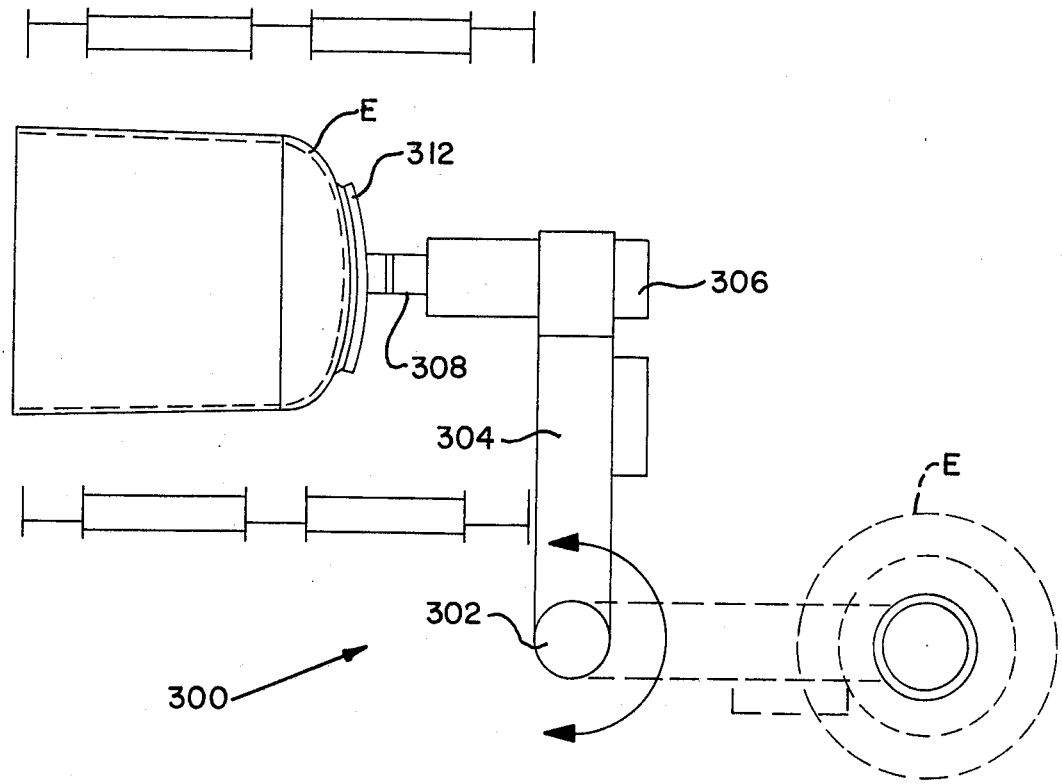
FIG. 20 is a schematic plan view of a tank car head manipulator.
Figure 21:
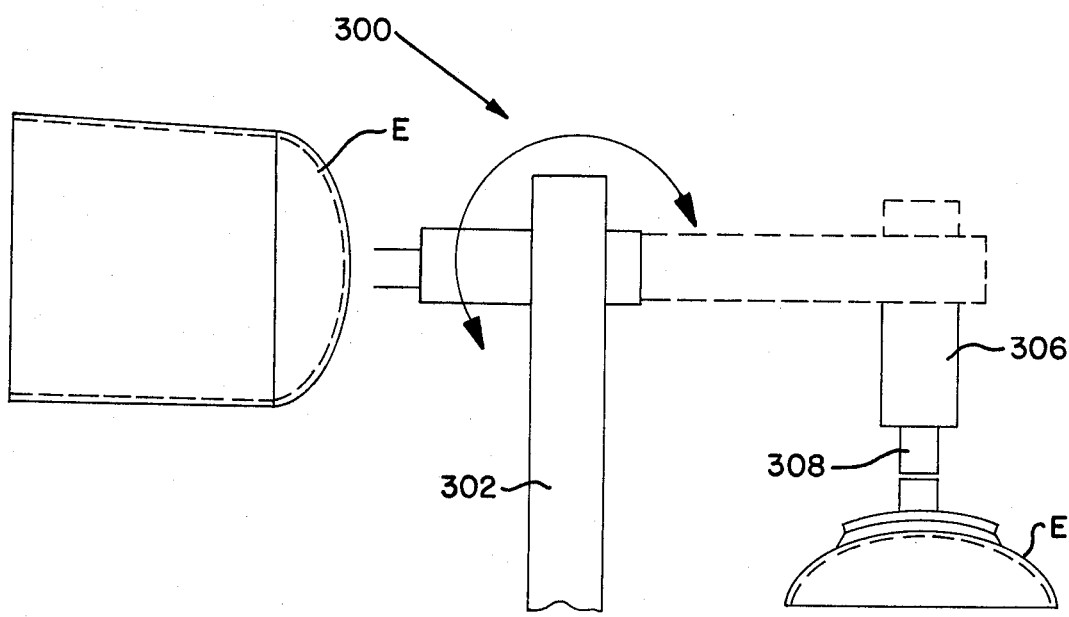
FIG. 21 is a side elevation view of the head manipulator illustrated in FIG. 20.

An optional head manipulator indicated at 300 in FIGS. 20 and 21 includes a floor mounted column 302 having a horizontal boom 304 which may swivel 180°. At the end of the boom is a hydraulic cylinder 306 having a piston 308 movable therein. Piston 308 is equipped with a vacuum lifter 312. Vacuum lifter 212 picks up an end E, shown in solid lines in FIG. 21 rotates it to the horizontal position and swings it into the welding cage, as shown in solid lines in FIG. 20. Pressure is maintained on the end by means of piston 308 acting within cylinder 306. Mechanical jacks 140 are first retracted as the end engages the course and then are moved inwardly to define the circular joint between the end and the course C1. The cage 17 is then rotated and the end is welded to the course C1 as described above.

What is claimed is:

1. Apparatus for supporting and rotating a pair of hollow tank sections of generally circular cross section during welding of the sections in end-to-end abutting relation to form an elongated tank comprising:
three longitudinally spaced, axially aligned, rotatable rings including a center ring and a pair of side rings mounted on each side of the center ring; said center ring including a plurality of circumferentially spaced, radially directed center jacks each extendible the same distance regardless of the resistance encountered by a particular jack to force the abutting edges of the tank sections into precise circular cross section, and support and hold the abutting edges in aligned relation during rotation and welding; said side rings including circumferentially spaced radially directed side jacks of the seek-and-find type that automatically extend until all jacks exert the same force on the tank sections extending from each side of the center ring to thereby support the tank sections for rotation about the common axis of the three rings; and means for rotating said rings about said common axis, and welding means for circumferentially welding the abutting edges of said tank sections during rotation.

2. Apparatus for internal circumferential welding of abutting tank sections comprising:
at least three longitudinally spaced rings including a center ring and at least one side ring spaced on each side of said center ring to define a welding cage; means for moving tank courses to be welded longitudinally relative to said spaced rings such that their edges are in abutting engagement in the center ring; said center ring having mounted thereon a plurality of circumferentially spaced, radially directed center jacks each extendible the same distance regardless of the resistance encountered by a particular jack to force the abutting edges of the tank sections into precise circular cross section and support and hold the abutting edges in alignment during rotation and welding; each of said side rings having mounted thereon a plurality of circumferentially spaced side jacks of the seek-and-find type which automatically extend until all jacks exert the same force on the tank sections to support and hold the same in welding position; welding means movable longitudinally within the welding cage operative to circumferentially weld the abutting edges within said center ring; and means for rotating the welding cage during circumferential welding of the abutting edges.

3. Welding apparatus according to claim 2 wherein the bottom jacks in said side rings are extendible the same distance regardless of the resistance encountered by a particular bottom jack.

4. Welding apparatus according to claim 3 wherein said bottom jacks in said side rings are driven from a common shaft.

5. Welding apparatus according to claim 4 wherein the bottom jacks in said side rings are mechanical jacks.

6. Welding apparatus according to claim 2 wherein the means for moving tank courses longitudinally into abutting engagement comprises a longitudinally extending conveyer.

7. Welding apparatus according to claim 2 wherein said center jacks are mechanical jacks including a ram movable within a cylinder.

8. Welding apparatus according to claim 7 wherein said ram is threaded and wherein the cylinder includes threads engaging the threads on said ram for rotating said ram to move said jacks radially within said center ring.

9. Welding apparatus according to claim 7 wherein said side jacks are hydraulic jacks.

10. Welding apparatus according to claim 2 wherein said side jacks comprise tank engaging means adapted to facilitate engagement with tank sections to be held in place during welding.

11. Welding apparatus according to claim 10 wherein said tank engaging means comprise cooperating spherical surfaces and means for allowing one spherical surface to move with respect to the other during tank section engagement.

12. Apparatus for internal circumferential welding of abutting tank sections comprising:
at least three longitudinally spaced rings including a center ring and at least one side ring spaced on each side of said center ring to define a welding cage; means for moving tank courses to be welded longitudinally relative to said spaced rings such that their edges are in abutting engagement in the center ring; said center ring having mounted thereon a plurality of circumferentially spaced, radially directed mechanical jacks each extendible the same distance regardless of the resistance encountered by a particular jack to force the abutting edges of the tank sections into precise circular cross section and support and hold the abutting edges in alignment during rotation and welding; each of said side rings having mounted thereon at the bottom at least one mechanical jack for raising and lowering tank courses, and a plurality of circumferentially spaced hydraulic jacks of the seek-and-find type which automatically extend until all jacks exert the same force on the tank sections to support and hold the same in welding position; tank engaging means on said hydraulic jacks to facilitate clamping of tank courses; welding means movable longitudinally within the welding cage operative to circumferentially weld the abutting edges within said center ring; and means for rotating the welding cage during circumferential welding of the abutting edges.

13. Apparatus according to claim 12 wherein the bottom jack in said center ring and the bottom jack in each of said side rings are driven from a common shaft.

14. Welding apparatus according to claim 8 wherein the means for driving said mechanical jacks comprises at least one motor and wherein said motor has integral therewith a shaft having a sprocket thereon and wherein a chain engages said sprocket and said chain engages a plurality of sprockets spaced about the periphery of said ring and wherein said chain drives said spaced sprockets to drive said rams.

15. Welding apparatus according to claim 2 wherein said welding means is also movable transversely of the rings.

16. Welding apparatus according to claim 2 including end translation means for picking up tank ends and moving the ends into engagement with tank courses to be welded.

17. Apparatus according to claim 16 wherein said end translation apparatus comprises a vacuum lift device.

18. Apparatus according to claim 17 wherein said end translation apparatus comprises a column and a boom rotatable on said column at least 180°.

19. Apparatus according to claim 18 wherein said end translation apparatus further comprises a hydraulic cylinder for maintaining engagement of said ends with a course during welding of the end to the course.

20. A method of circumferentially welding a pair of hollow tank sections of generally circular cross section in end-to-end abutting relation to form an elongated tank comprising: providing three longitudinally spaced, axially aligned, rotatable rings including a center ring and a pair of side rings on either side of said center ring; the center ring including a plurality of circumferentially spaced, radially directed center jacks each extendible the same distance regardless of the resistance encountered by a particular jack to force the abutting edges of the tank sections into a precise circular cross section and support and hold the abutting edges in aligned relation during rotation and welding; the two side rings including circumferentially spaced radially directed side jacks of the seek and find type that will automatically extend until all jacks exert the same force on the tank sections extending from each side of the center ring to thereby support the tank sections for rotation about the common axis of the three rings; longitudinally aligning first and second tank sections to be welded such that the ends of the first and second tank sections to be welded abut in said center ring; clamping the abutting edges of the first and second tank sections together with said center jacks, thereby forcing the abutting edges into mating circular configuration; clamping the first and second tank sections respectively in said side rings with said side jacks to support the tank sections about the common axis of the three rings; moving welding equipment longitudinally within one of said hollow tank sections to a point within said center ring adjacent the abutting edges; rotating said center ring and said side rings with the abutting tank sections clamped therein; and welding the abutting edges together as said tank sections are rotated.

21. A method according to claim 20 wherein the welding of the abutting edges is carried out at the bottom of said center ring.

22. A method according to claim 20 wherein tanks of different diameter can be welded together in said rings without changing the diameter of said center ring or said side rings when a tank having a diameter different than the diameter of the previous tank welded in said rings is to be welded in said rings.

23. A method according to claim 20 wherein more than two tank sections are welded together to form a given tank and wherein the diameter of the abutting edges in the center ring of the second and third tank sections is different from the diameter of the abutting edges of the first and second tank sections.

24. A method according to claim 23 wherein said second and third tank sections are frusto-conical scalene cone tank sections.

* * * * *